(12) United States Patent
Schunk et al.

(10) Patent No.: US 10,653,981 B2
(45) Date of Patent: May 19, 2020

(54) FILTER ELEMENT

(71) Applicant: HYDAC FILTER SYSTEMS GMBH, Sulzbach/Saar (DE)

(72) Inventors: Andreas Schunk, Waldmohr (DE); Dominic Schneider, Namborn (DE)

(73) Assignee: HYDAC FILTER SYSTEMS GMBH, Sulbach/Saar (DE)

( * ) Notice: Subject to any disclaimer, the term of this patent is extended or adjusted under 35 U.S.C. 154(b) by 0 days.

(21) Appl. No.: 16/378,786

(22) Filed: Apr. 9, 2019

(65) Prior Publication Data

US 2019/0232203 A1 Aug. 1, 2019

Related U.S. Application Data

(62) Division of application No. 14/779,583, filed as application No. PCT/EP2014/000919 on Apr. 5, 2014, now abandoned.

(30) Foreign Application Priority Data

May 3, 2013 (DE) .......................... 10 2013 007 605

(51) Int. Cl.
*B01D 27/00* (2006.01)
*B01D 29/33* (2006.01)
(Continued)

(52) U.S. Cl.
CPC ......... *B01D 29/333* (2013.01); *B01D 29/232* (2013.01); *B01D 35/005* (2013.01);
(Continued)

(58) Field of Classification Search
CPC ........ B01D 27/00; B01D 27/04; B01D 27/06; B01D 27/07; B01D 27/14; B01D 39/00;
(Continued)

(56) References Cited

U.S. PATENT DOCUMENTS 5,522,909 A 6/1996 Haggard
5,827,430 A * 10/1998 Perry, Jr. ............... B01D 29/111
210/497.01
(Continued)

FOREIGN PATENT DOCUMENTS

WO 2009/071636 6/2009

OTHER PUBLICATIONS

International Search Report (ISR) dated Aug. 1, 2014 in International (PCT) Application No. PCT/EP2014/000919.
(Continued)

*Primary Examiner* — Allison G Fitzsimmons
(74) *Attorney, Agent, or Firm* — Wenderoth, Lind & Ponack, L.L.P.

(57) ABSTRACT

A filter element for fluids, in particular for hydraulic fluid, has a foldable filter casing (10) with at least one filter layer (18, 20, 22, 24) extending between two end caps (26, 32). To vary in regions the thickness of the filter casing (10), the height ($h_1$) of each filter fold (12, 44) increases from one end cap (26) to the other end cap (32). Alternatively, with the filter fold height ($h_1$) being maintained, the outer diameter (40) of the filter casing (10) varies in the direction of one of the end caps (26, 32).

8 Claims, 6 Drawing Sheets

(51) Int. Cl.
  *B01D 46/24* (2006.01)
  *B01D 46/52* (2006.01)
  *B01D 29/23* (2006.01)
  *B01D 35/00* (2006.01)
  *B01D 39/00* (2006.01)

(52) U.S. Cl.
  CPC ........ *B01D 46/2411* (2013.01); *B01D 46/522* (2013.01); *B01D 2201/02* (2013.01); *B01D 2201/122* (2013.01); *B01D 2275/201* (2013.01)

(58) Field of Classification Search
  CPC ........ B01D 39/10; B01D 39/14; B01D 39/16; B01D 39/1684; B01D 39/1692; B01D 2273/00; B01D 2273/10; B01D 2273/20; B01D 2273/105; B01D 2273/201
  USPC ....... 210/348, 457, 458, 473, 483, 484, 485, 210/493.1, 493.4, 493.5, 496, 497.01, 210/497.3, 500.1
  See application file for complete search history.

(56) References Cited

U.S. PATENT DOCUMENTS

| | | | |
|---|---|---|---|
| 6,315,130 B1 * | 11/2001 | Olsen | B01D 27/06 |
| | | | 210/490 |
| 2002/0189993 A1 | 12/2002 | Lang | |
| 2010/0243554 A1 | 9/2010 | Herrin et al. | |
| 2012/0055127 A1 | 3/2012 | Holzmann et al. | |
| 2012/0241366 A1 * | 9/2012 | Derstler | B01D 29/21 |
| | | | 210/232 |
| 2013/0062276 A1 | 3/2013 | Barreteau et al. | |

OTHER PUBLICATIONS

Grous, 2011, Applied Metrology for Manufacturing Engineering, Instrumentation and Measurement Series, Chapter 4, pp. 237-308. (Year: 2011).

* cited by examiner

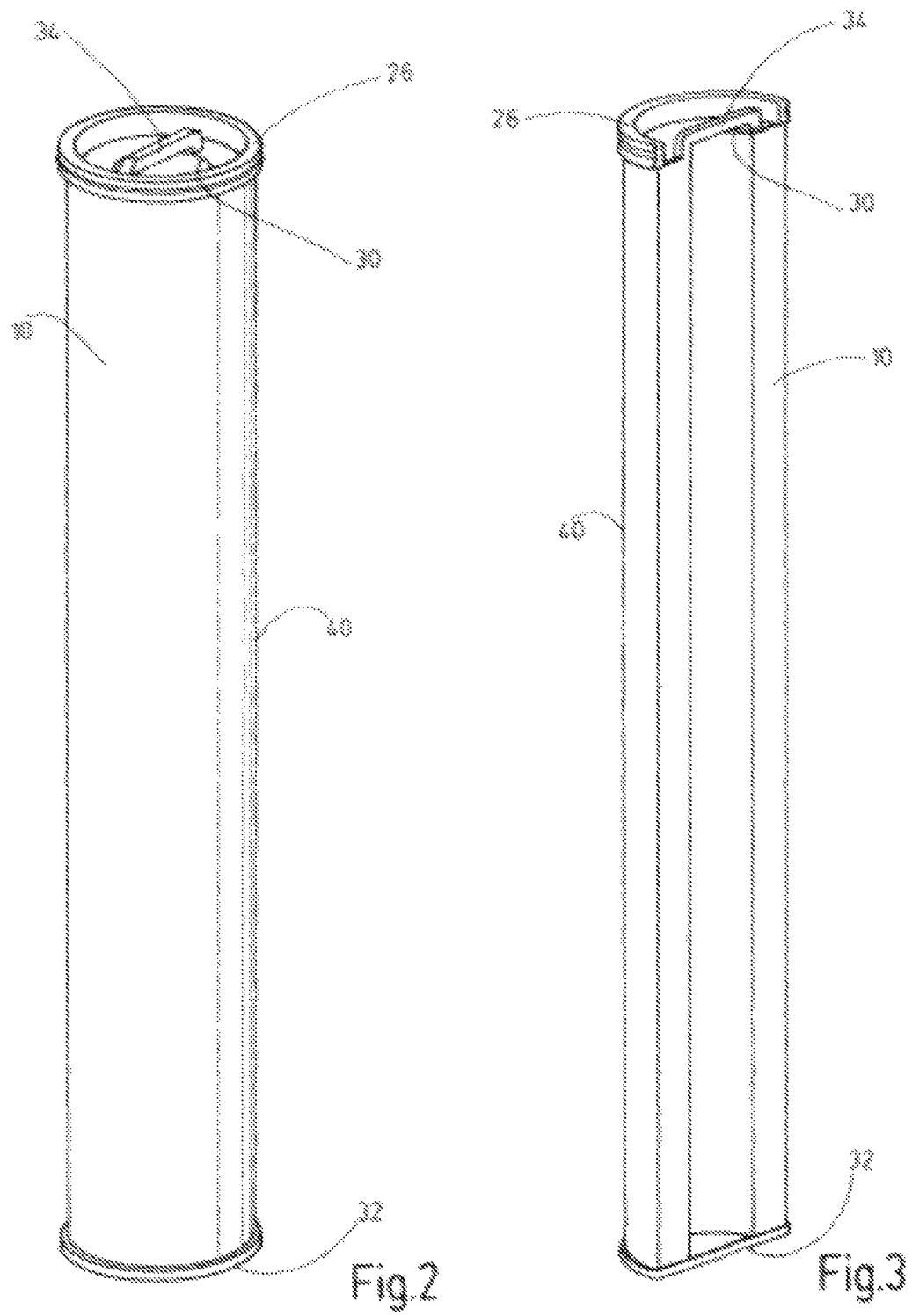

FILTER ELEMENT

REFERENCE TO RELATED APPLICATION

This application is a Divisional application of U.S. patent application Ser. No. 14/779,583, filed Sep. 24, 2015, the entire subject matter of which is incorporated by reference.

FIELD OF THE INVENTION

The invention concerns a filter element for fluids, in particular for hydraulic fluids, having at least one foldable filter liner with at least one filter layer. The filter liner extends between two end caps.

BACKGROUND OF THE INVENTION

Filter elements of this kind are customary. Such filter elements are widely used in conjunction with fluid systems of all kinds for filtering processing fluids, compression fluids such as hydraulic oils, liquid fuels and lubricants, as well as for the treatment of liquid media and the like. Fluid systems, in which the filter elements are used, provide in many instances only a limited amount of space for the installation or removal of those system components that contain the respective filter candle-shaped filter elements. Nevertheless, in order to be able to filter correspondingly large fluid flows, a sufficiently large filter surface is required from the filter element.

To provide a sufficiently large filter surface, the known, commercially freely available filter elements typically have multiple layers of different filter materials of a zig-zag-like folded or pleated filter medium. During production, the filter medium is passed through a cutting facility in which the filter material is trimmed to size along the edges before it is fed to a folding machine where the zig-zag-shape or pleating is formed. In the next stage of production, the trimmed filter medium is cut into sections that are formed into a tubular body, which forms the filter element.

SUMMARY OF THE INVENTION

An object of the invention to provide an improved filter element, which is characterized by a high filtering capacity even after a long service life.

This object is basically met by a filter element having a zonal variation of the thickness of the filter liner, where the height of the respective filter pleats increases, starting from one end cap to the other end cap, or in which the outer diameter of the filter liner increases in the direction of one end cap whilst the height of the filter pleats is maintained.

The shape of the filter liner that is provided according to the invention, which may, for example, be designed such that the outer and/or inner liner surface of the filter liner extends conically, opens up the opportunity to adapt the filter liner, or more accurately, the structure of the filter layers that form the filter liner, optimally to the varying pressure and flow conditions that occur in the different regions between the end caps. For example, the fact that a higher or lower static pressure exists close to one of the end caps, can be accommodated through a greater height of the folds and the resultant thickening of the filter liner. In this respect, the outer diameter of the filter liner at one or the other end cap can be made greater than in the vicinity of the other end cap. This arrangement can achieve a more even flow through the filter, which results in a low pressure loss at reduced turbulence, resulting, in turn, in a high filtering capacity and a long service life.

In particularly advantageous exemplary embodiments, in which the filter liner surrounds a hollow space, the arrangement may be advantageously designed such that the one end cap is provided with a passage to supply unfiltrate, which flows through the filter liner from the hollow space outwards in filtration direction, and in which the other end cap is closed to said flow.

That inflow of the unfiltrate from the direction of one of the end caps provides the particular advantage that the height of the filter pleats changes in that it increases in the direction towards the closed end cap. As a result of that increased thickness of the filter liner in the vicinity of the closed end cap, the increased dynamic pressure level is taken into account, which increased pressure is present in the vicinity of the closed end cap when unfiltrate is fed in from the other, open end cap.

The change in the height of the filter pleats can be constant to achieve a conical shape of the outer and/or inner side of the filter liner.

In particularly advantageous exemplary embodiments, the increase in the height of the pleats creates a zonal increase of the outer diameter of the filter liner. The filter element then has the shape of an externally conical filter candle. The conicity may be relatively small, for example, in the range of 1 to 2 angular degrees.

Alternatively, the arrangement may be such that the increase in the height of the pleats causes not only a zonal increase in the outer diameter of the filter liner, but also a zonal decrease of the internal diameter of the hollow space of the filter liner. Thus, the conical shape of the outside results also in an inner cone shape in the internal hollow space of the filter liner.

The outer diameter of the filter liner preferably increases from the open end cap towards the closed end cap. When feeding unfiltrate from the upper end cap, the cone shape that tapers from bottom to top is advantageous for the flow of the filter medium.

When forming the pleated filter liner by folding the filter layers, the process followed may be such that, to pleats of a first kind which, due to their height, make up the majority of the thickness of the filter element. Pleats of a second kind are added, preferably alternating, and are lower in height than those of the first kind. This type of folding pattern, also called M-pleat or W-pleat, has advantages with respect to the configuration of the filter liner according to the invention, such as lower pressure losses, increased capacity to absorb contaminants and an increased security against a kind of "blockage". Such disadvantages can occur in conventional filter elements through immediate contact between effective pleat surfaces, depending on the flow conditions.

As an alternative to changing the thickness of the filter liner through a change in filter pleat heights, which is caused by a corresponding kind of folding pattern, the zonal variation of the thickness of the filter liner can also be achieved through local application of additional, in particular strip-shaped, filter layers, while maintaining the same pleat height. For example, a varying number of filter layers can be provided from one edge of the filter layer mat, which forms the filter liner, to the other edge of the filter mat.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2 is a perspective view of a filter element according to an exemplary embodiment of the invention;

FIG. 3 is a perspective view in section of the exemplary embodiment of FIG. 2;

DETAILED DESCRIPTION OF THE INVENTION

Figure 1:
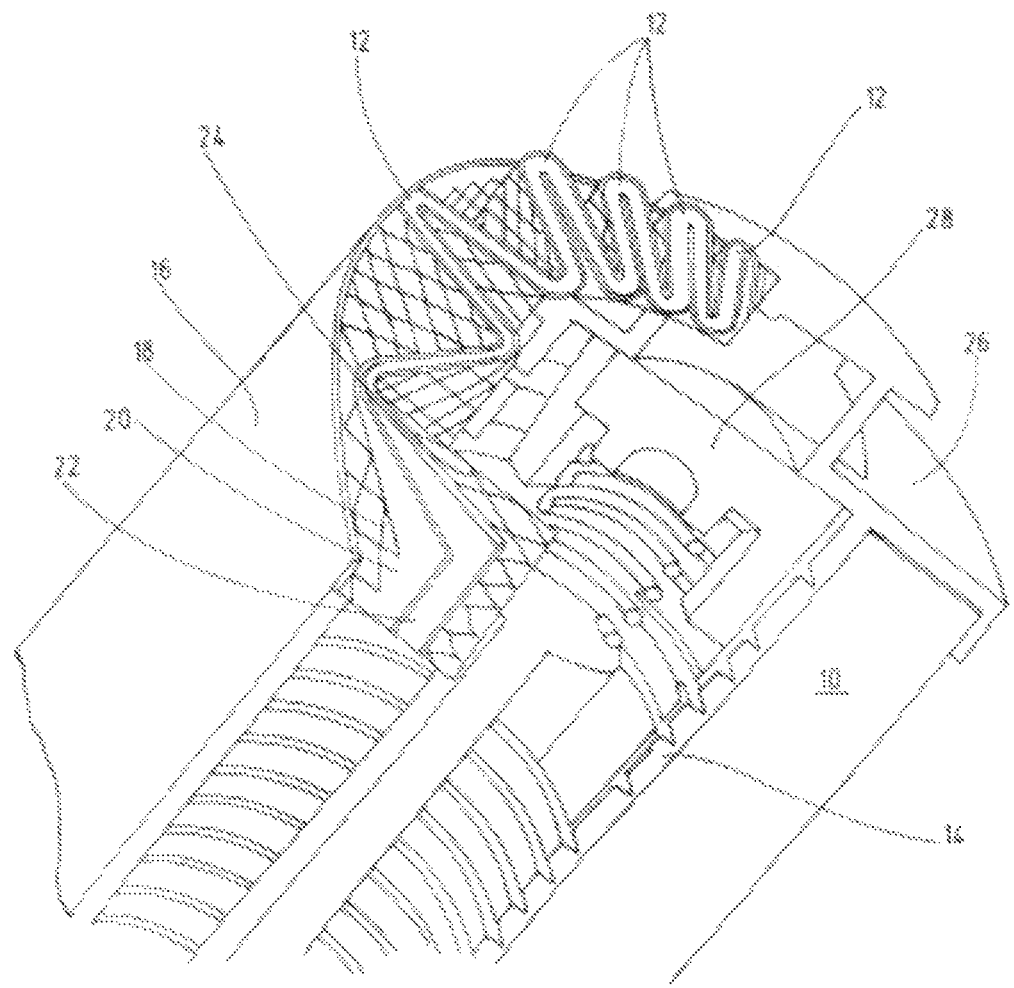
FIG. 1 is a schematically simplified, partial perspective view in section of the upper part of the filter element according to the prior art.

The filter element that is partially illustrated in FIG. 1, which constitutes the prior art, has a filter liner 10 as the filter material with a predefinable surface area and predefinable filter characteristics. The filter liner 10 is pleated, as illustrated in FIG. 1, with individual filter pleats 12, which extend in a tight package sequence between an inner fluid-permeable support tube 14 and an outer cylindrical casing 16, which is likewise fluid-permeable. The casing 16 may be formed of a mesh structure made from plastic or stainless steel or similar material. For the sake of a clearer depiction, the individual filter pleats 12 are depicted slightly pulled apart in the left, upper part of FIG. 1. The individual layer structure of the pleated filter liner 10 is revealed from the partial depiction facing the observer.

In the case of filter elements of this kind, the filter liner 10 typically comprises a first support layer 18, a second layer 20 as a protective nonwoven, a third layer 22 as the main nonwoven or filter layer, optionally a further, likewise adjoining, not depicted, layer of a protective nonwoven and, if applicable, a fourth layer in form of another support layer 24 extending along the inner circumference. The support layers 18, 24 formed of a wire fabric, a plastic grid or a plastic fabric. One of these support layers 18, 24 serves as a drainage layer in addition to its supporting function. The protective nonwovens 20 are normally composed of a plastic nonwoven. The main nonwoven layer, or filter layer 22, is composed of materials such as glass fiber paper, synthetic filter material (melt-blown fibers), cellulose paper, or the like. The layers referred to above can also be made from composite materials of the same type, or of a different type. Depending on the layer structure and on the respective filter materials used, the filter liner 10 has predefinable filter characteristics, in accordance with the filtration task. On principle, a high pressure differential stability is desired, as well as a high β-stability across a wide pressure differential range, as well as predefinable filter fineness. Sufficient flow channels should be available on the filter element for decreasing the pressure differential, while a good resilience against changing pressure loads should be ensured at the same time.

With respect to FIG. 1, fluid flows through the filter liner 10 in the known filter element from the exterior to the interior. The filter element rests, at its relevant folds on its internal circumference, against the external circumference of the support tube 14, on the annular outlets thereof. Each of the filter element axial ends is accommodated in an end cap. Only the upper end cap 26 is depicted in FIG. 1, which also comprises a spring-loaded bypass valve 28 that enables the passage of fluid for safety reasons, even if the filter element 10 is blocked by contaminants.

The FIG. 2, in contrast, depicts an exemplary embodiment of the filter element according to the invention in form of a type of filter candle in which, during the filtering process, the medium flows through the filter liner 10 from the inside to the outside. Correspondingly, the end cap 26 shown in FIG. 2 at the top is provided with a central passage 30 for the supply of unfiltrate, while the lower end cap 32 is closed. In FIG. 2, as well as in FIG. 3 showing the exemplary embodiment in longitudinal section, the outer casing 16 of FIG. 1 has been omitted in each at FIGS. 2 and 3. A handle 34 is molded on the open end cap 26 and facilitates handling when installing or removing the filter element in a filter housing or a tank (neither of which are shown). The outside of the filter element shown in FIG. 2 and FIG. 3 tapers slightly conically along and relative to the vertical or longitudinal axis 100 of the filter element from the closed, lower end cap 32 to the upper, open end cap 26, which taper is hardly visible in the depiction in FIGS. 2 and 3 since the angle of the conical taper in the example shown is only one angular degree.

Figure 5:
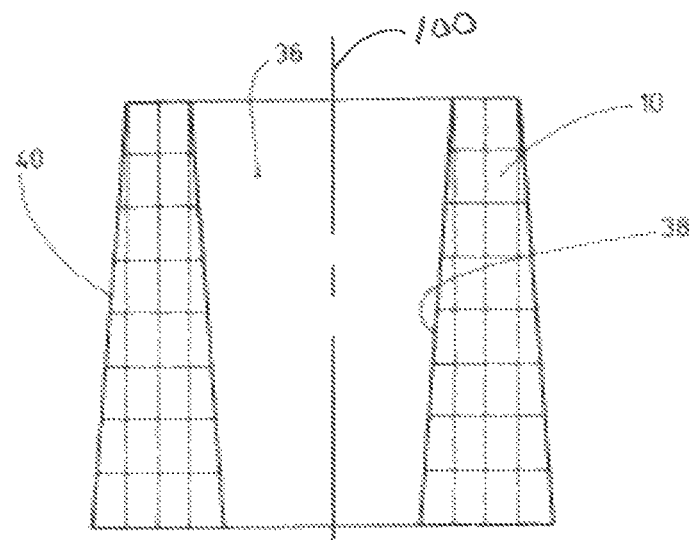
FIGS. 5 and 6 are functional sketches, similar to FIG. 4, of the filter liner according to second and third exemplary embodiments, respectively, of the invention.
Figure 4:
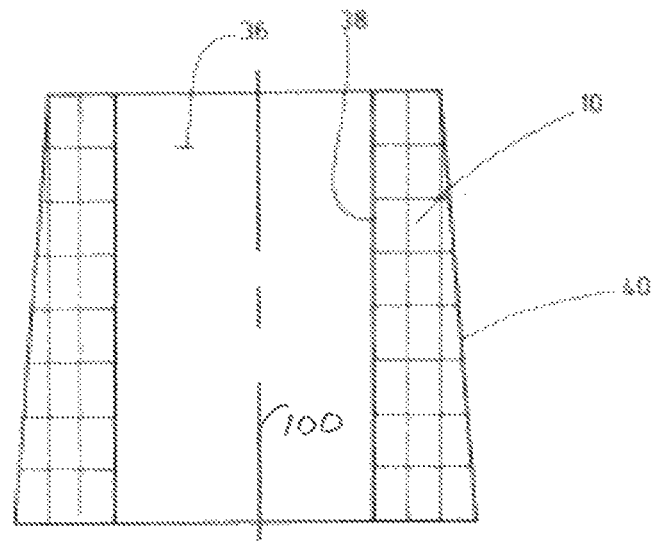
FIG. 4 is a schematically, very simplified functional sketch showing the configuration of only the filter liner for a first exemplary embodiment of the filter element according to the invention, in which the representation depicts an exaggeratedly large cone angle that is not to scale.
Figure 6:
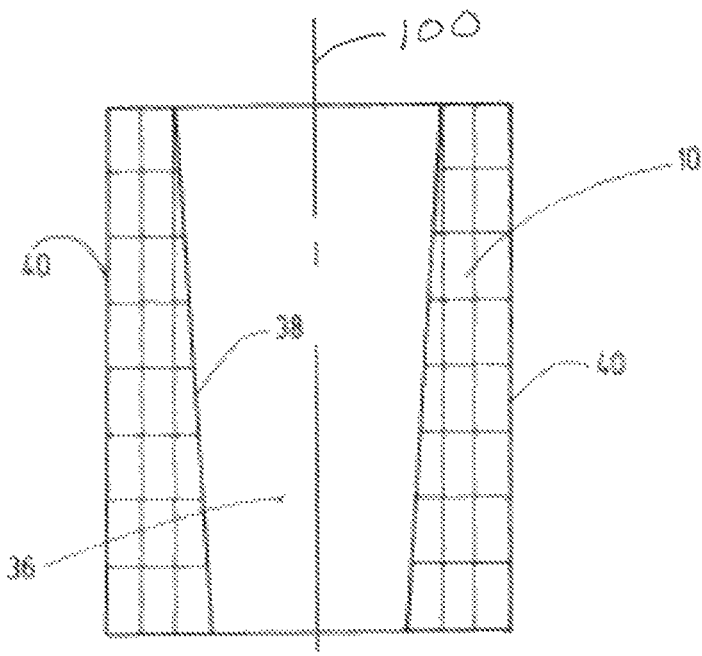

The FIGS. 4 to 6 depict, through highly simplified and not-to-scale sketches that show the cone angles exaggeratedly large to facilitate understanding, a number of possibilities to shape the filter liner 10 in such a way that the thickness of the filter liner 10 varies from one end cap to the other end cap. To increase of the thickness of the filter liner 10 from top to bottom, that is, from the upper, open end cap 26 to the lower, closed end cap 32, a variation of the radial pleat height or radial height $h_1$ (see FIG. 9) of the filter pleats 12, 44 is provided in each of the examples from FIGS. 4 to 6. The variation of the filter pleat height shown in each of the examples of FIGS. 4 to 6 is constant, resulting in a cone shape of the filter liner 10. In this respect the FIG. 4 depicts a configuration in which the inner hollow space 36 with its inner surface 38, which is surrounded by the filter liner 10, defines a hollow cylinder, whereas the outer surface 40 is enlarged from top to bottom. In contrast, the example shown in FIG. 5 differs in that the height $h_1$ of the filter pleats 12, 44 decreases from bottom to top, which not only gives the inner hollow space 36 a conical shape in which the inner surface 38 diverges from top to bottom and thus reduces the inner diameter of the hollow space 36, but at the same time the outer surface 40 forms a cone that tapers towards the top, which is also the case in FIG. 4. In contrast, the example depicted in FIG. 6 shows that the outer surface 40 is cylindrical, whereas the inner hollow space 36 is conically tapered from top to bottom since the internal diameter of the inner surface 38 of the hollow space 36 decreases towards the bottom when measured.

Figure 7:
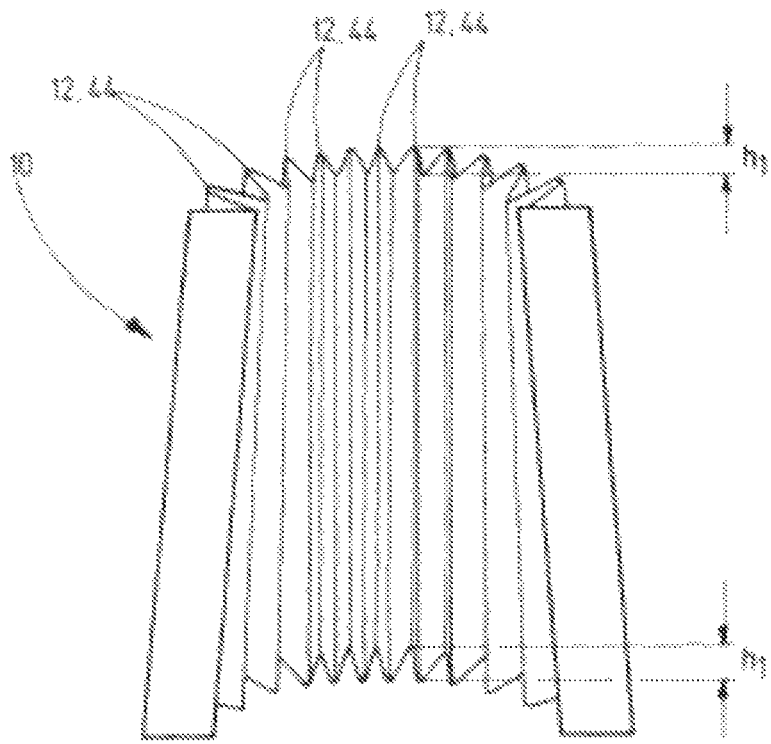
FIG. 7 is a schematically simplified, perspective view of a filter liner for one exemplary embodiment of the invention, shown in expanded or exploded view.

The exemplary embodiment in FIG. 7 in turn differs in that, at a constant pleat height $h_1$, the filter liner 10 is pulled apart slightly in the lower section so as to create an outer diameter that decreases towards the top.

Figure 8:
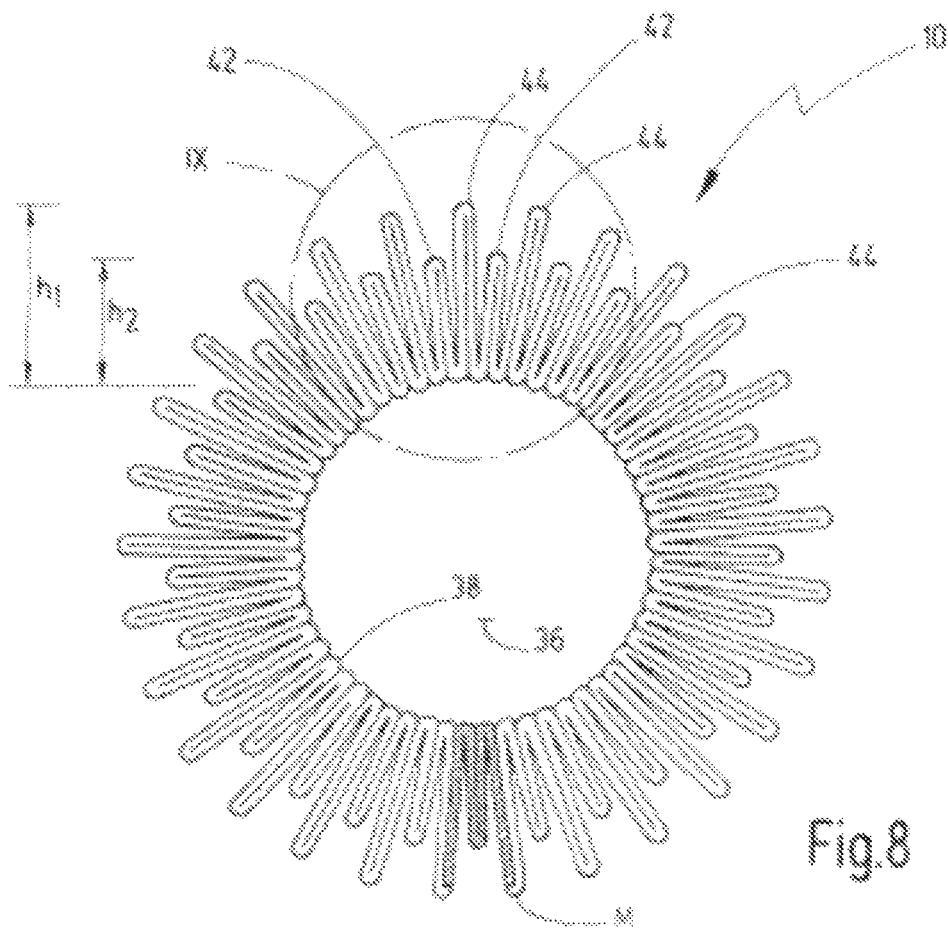
FIG. 8 is a schematically simplified, top view of the filter liner of a further exemplary embodiment of the invention.
Figure 9:
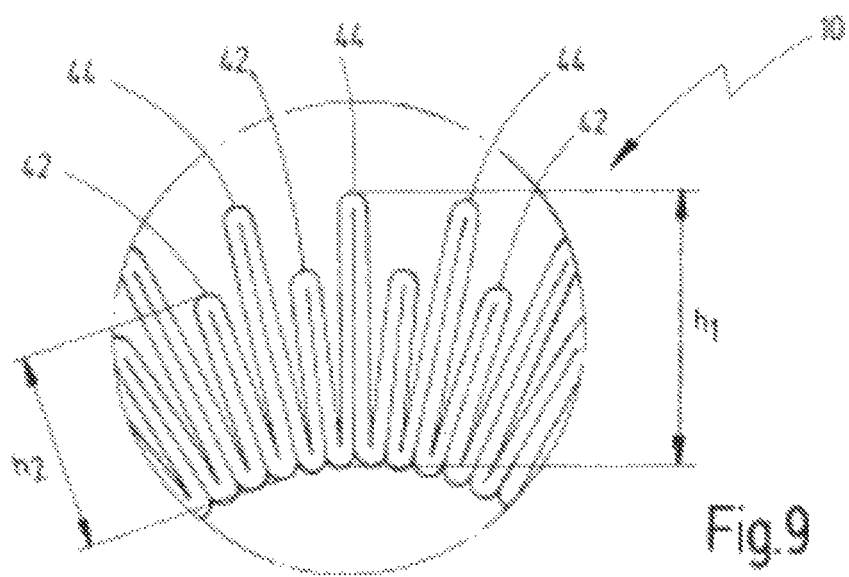
FIG. 9 is an enlarged, top view of the section marked with IX in FIG. 8.

The FIGS. 8 and 9 depict a special, advantageous type of pleating for filter liner 10 in form of a so-called M-pleat. In FIG. 8, the pleated section is hatched and referenced with M. Alternating to pleats 44 of a first kind, which through their pleat height $h_1$ determine the thickness and thus the outer diameter of the formed filter liner 10. This type of pleating provides filter pleats 42 of a second kind that have a lower radial height or radial pleat height $h_2$. To be able to provide this type of pleating, the M-pleating, with a desired conical shape, a corresponding variation of the pleat height $h_1$ for the pleats 44 of the first kind across the height of the filter liner 10 is provided.

As already mentioned, the variation in the height of the filter pleats does not have to be constant. Instead of providing a regular conical shape on the outer surface 40 or the inner surface 38 of the filter liner 10, a ball-shaped or an irregular contour can be formed along the filter liner 10 through increasing and decreasing pleat heights.

Figure 10:
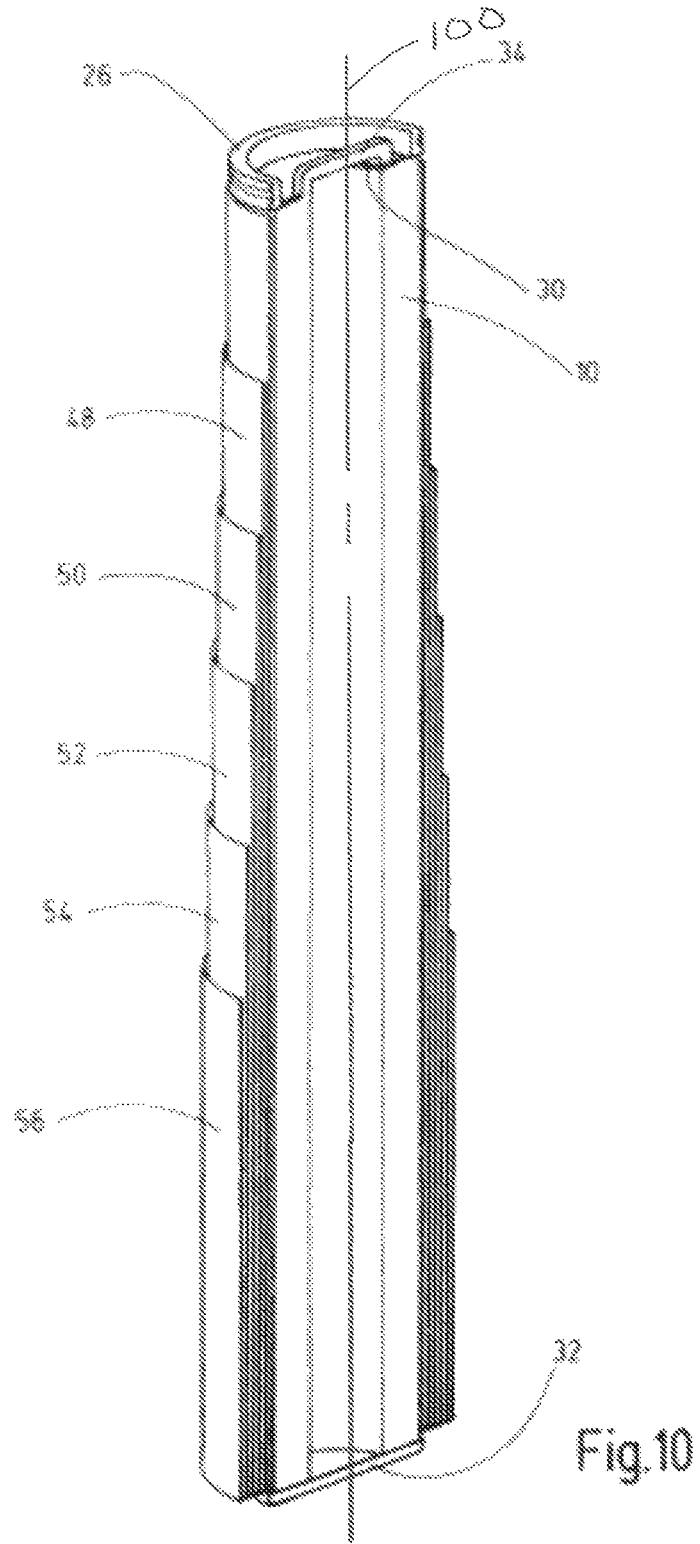
FIG. 10 is a perspective view in section of the filter element according to a still further exemplary embodiment of the invention.

The depiction of FIG. 10, which is similar to that of FIG. 3, shows a further exemplary embodiment in which, with the filter pleat height of the filter liner 10 remaining unchanged. A desired zonal variation of the thickness of the filter liner 10 is achieved in that additional filter layers 48, 50, 52, 54 and 56 are provided on the filter liner 10 in form of strips of different widths in the vertical or longitudinal direction along longitudinal axis 100. As shown in FIG. 10, the vertical extension of the additional layers is such that the increased thickness, caused by the layers, increases in a radial or transverse direction relative to the longitudinal axis 100 from top to bottom because all additional layers overlap in the bottom section. In the upper section, the widest additional layer 48 is exposed, and no additional layer is present in the end section adjacent to the upper end cap 36. This structure results in the desired shape of the outer diameter being tapered towards the top. The additional layers 48, 50, 52, 54, 65 may be made from different materials, for example, additional filter layers and/or support layers and/or drainage layers.

While various embodiments have been chosen to illustrate the invention, it will be understood by those skilled in the art that various changes and modifications can be made therein without departing from the scope of the invention as defined in the claims.

What is claimed is:

1. A filter element for fluids, comprising:
    a filter liner having at least one filter layer extending along a longitudinal axis;
    first and second end caps on first and second axial ends, respectively, of said filter liner; and
    a zonal variation of thicknesses of said filter liner in a radial direction of said longitudinal axis tapering from said second end cap to said first end cap such that the filter liner forms an externally tapered filter candle along said longitudinal axis of said filter liner by an outer diameter of said filter liner changing from said second end cap to said first end cap, said outer diameter and said thickness changing by said filter liner including different numbers strip-shaped filter layers at different areas of said filter liner spaced along said longitudinal axis, said different numbers of said striped-shaped layers increasing from said first end cap to said second end cap, said strip-shaped filter layers having different lengths along said longitudinal axis, all of said strip-shaped filter layers of said filter liner having an axial end located in a common plane adjacent said second end cap.

2. A filter element according to claim 1 wherein
    said filter liner surrounds a hollow space;
    said second end cap comprises a fluid passage for conveying unfiltrate into said hollow space to flow in a filtration direction from said hollow space through said filter liner to an outer outside of said filter liner; and
    said first cap is closed to fluid flow therethrough.

3. A filter element according to claim 1 wherein
    said strip-shaped filter layers have pleats with radial heights.

4. A filter element according to claim 3 wherein
    said pleats include first pleat members having a first pleat height and second pleat members having a second pleat height, said first pleat height being greater than said second pleat height, said first pleat members determining a majority of a radial thickness of said filter liner.

5. A filter element according to claim 4 wherein
    said first and second pleat members alternate along a circumference of said fluid liner.

6. A filter element according to claim 1 wherein
    said filter liner is tubular with a hollow inner cavity.

7. A filter element according to claim 1 wherein
    said filter candle has a circular shape in cross section transverse to said longitudinal axis.

8. A filter element according to claim 1 wherein
    said first end cap is an upper end cap; and
    said second end cap is a lower end cap.

* * * * *